United States Patent
Zalzalah et al.

(10) Patent No.: US 10,841,782 B2
(45) Date of Patent: Nov. 17, 2020

(54) WIRELESS SERVICE EXTENSION USING D2D AND METHOD TO DETERMINE COMMUNICATION PATH AND EMERGENCY SERVICE

(71) Applicant: Telefonaktiebolaget LM Ericsson (publ), Stockholm (SE)

(72) Inventors: Luay Zalzalah, Ottawa (CA); Najeh Abu-Farha, Ottawa (CA)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 41 days.

(21) Appl. No.: 16/315,182

(22) PCT Filed: Jan. 30, 2017

(86) PCT No.: PCT/IB2017/050495
§ 371 (c)(1),
(2) Date: Jan. 4, 2019

(87) PCT Pub. No.: WO2018/138554
PCT Pub. Date: Aug. 2, 2018

(65) Prior Publication Data
US 2019/0253868 A1  Aug. 15, 2019

(51) Int. Cl.
*H04W 8/00* (2009.01)
*H04W 4/70* (2018.01)
(Continued)

(52) U.S. Cl.
CPC .......... *H04W 8/005* (2013.01); *H04W 4/70* (2018.02); *H04W 4/90* (2018.02); *H04W 40/22* (2013.01);
(Continued)

(58) Field of Classification Search
CPC ..... H04W 76/14; H04W 40/22; H04W 88/04; H04W 72/04; H04W 76/50; H04W 8/005;
(Continued)

(56) References Cited

U.S. PATENT DOCUMENTS

2010/0279647 A1  11/2010  Jacobs et al.
2013/0017802 A1   1/2013  Adibi et al.
(Continued)

FOREIGN PATENT DOCUMENTS

EP   2 858 453 A1    8/2015
WO   2016/099227 A1  6/2016

OTHER PUBLICATIONS

International Search Report and Written Opinion of the International Searching Authority dated Nov. 10, 2017 issued in corresponding PCT Application No. PCT/IB2017/050495, consisting of 11 pages.
(Continued)

*Primary Examiner* — Awet Haile
(74) *Attorney, Agent, or Firm* — Sage Patent Group

(57) ABSTRACT

A method and devices for determining a communication path from a source wireless device to a destination device in a wireless communication network are provided. According to one aspect, a method includes discovering, at the source wireless device, wireless devices within communication range of the source wireless device. The method also includes determining, at the source wireless device, for each discovered wireless device, one of whether the discovered wireless device is the destination device and whether the discovered wireless device has wireless connectivity to a wireless base station. The method further includes including each discovered wireless device in a discovered wireless device list, and prioritize the list of discovered wireless devices.

19 Claims, 9 Drawing Sheets

(51) Int. Cl.
H04W 4/90 (2018.01)
H04W 40/22 (2009.01)
H04W 48/20 (2009.01)
H04W 88/04 (2009.01)
H04W 76/50 (2018.01)
H04W 76/14 (2018.01)

(52) U.S. Cl.
CPC ........... *H04W 48/20* (2013.01); *H04W 76/14* (2018.02); *H04W 76/50* (2018.02); *H04W 88/04* (2013.01)

(58) Field of Classification Search
CPC ..... H04W 12/06; H04W 36/03; H04W 36/08; H04W 48/16; H04W 4/027; H04W 4/029; H04W 4/40; H04W 4/80; H04W 72/0486; H04W 88/06; H04B 7/15507; Y02D 70/22; Y02D 70/39; Y02D 70/446
See application file for complete search history.

(56) References Cited

U.S. PATENT DOCUMENTS

| 2013/0083779 | A1* | 4/2013 | Ahn | H04W 72/04 370/336 |
|---|---|---|---|---|
| 2016/0212682 | A1* | 7/2016 | Chung | H04W 76/14 |
| 2017/0015263 | A1* | 1/2017 | Makled | B60R 21/00 |
| 2018/0041889 | A1* | 2/2018 | Chen | H04W 40/02 |

OTHER PUBLICATIONS

Renesas Mobile Europe Ltd., "Connection Setup Via ProSe UE-to-Network Relay", 3rd Generation Partnership Project, Mobile Competence Center, May 27-31, 2013, consisting of 4 pages.
Janefalkar A A et al., "Cellular Ad-Hoc Relay for Emergencies (CARE)" 2004 IEEE 60th Vehicular Technology Conference, Sep. 26, 2004, consisting of 5 pages.
Written Opinion of the International Preliminary Examining Authority issued Dec. 14, 2018 in corresponding PCT Application No. PCT/IB2017/050495, consisting of 6 pages.
Arash Asadi et al., "A Survey on Device-to-Device Communication in Cellular Networks", Apr. 29, 2014, IEEE, consisting of 18 pages.
Leonardo Babun et al., "Multi-Hop and D2D Communications for Extending Coverage in Public Safety Scenarios", 40th Annual IEEE Conference on Local Computer Networks, LCN 2015, Clearwater Beach, Florida, consisting of 8 pages.
Jose Mairton B. Da Silva Jr. et al., "Performance Analysis of Network-Assisted Two-Hop D2D Communications" Jul. 6, 2014, Federal University of Ceara (UFC), Fortaleza, Ceara, Brazil, Ericsson Research, Stockholm, Sweden, consisting of 6 pages.

Daohua Zhu, "Downlink Resource Reuse for Device-to-Device Communications Underlaying Cellular Networks" IEEE Signal Processing Letters, vol. 21, No. 5, May 2014, consisting of 4 pages.
Klaus Doppler et al., "Device-to-Device Communication as an Underlay to LTE-Advanced Networks" IEEE Communications Magazine, Topics in Radio Communications, Dec. 2009, consisting of 8 pages.
Youngju Hwang et al., "On the Throughput Gain of Device-to-Device Communications", Science Direct, ICT Express, vol. 1, Issue 2, Sep. 2015, consisting of 6 pages.
Scott Fowler, et al., "Simple Network Design and Power Allocation for 5G Device-to-Device Communication", Linköping University Post Print, Mobile Telecoms., 2014, IEEE 19th International Workshop on Computer Aided Modeling and Design of Communication Links and Networks (CAMAD), consisting of 6 pages.
Minming Ni et al., "A Geometrical-Based Throughput Bound Analysis for Device-to-Device Communications in cellular Networks", IEEE Journal on Selected Areas in Communications, vol. 33, No. 1, Jan. 2015, consisting of 11 pages.
Lei Lei et al., "Operator Controlled Device-to-Device Communications in LTE-Advanced Networks" IEEE Wireless Communications, Jun. 2012, consisting of 9 pages.
Pekka Jänis et al., "Device-to-Device Communication Underlaying Cellular Communications Systems", Int. J. Communications, Network and System Sciences, Jun. 2009, consisting of 10 pages.
Mohsen Nader Tehrani et al., "Device-to-Device Communication in 5G Cellular Networks: Challenges, Solutions, and Future Directions" 5G Wireless Communications Systems: Prospects and Challenges, IEEE Communications Magazine, May, 2014, consisting of 7 pages.
Xingqin Lin, et al. "Spectrum Sharing for Device-to-Device Communication in Cellular Networks", Department of Electrical and Computer Engineering, The University of Texas, Sep. 2014, consisting of 14 pages.
Jongwoo Hong et al., "Analysis of Device-to-Device Discovery and Link Setup in LTE Networks", 2013 IEEE 24th International Symposium on Personal Indoor and Mobile Radio Communications, Sep. 8-11, 2013, consisting of 5 pages.
Dorin Panaitopol et al., "Recent Advances in 3GPP Rel-12 Standardization Related to D2D and Public Safety Communications" arXiv preprint arXiv:1505.07140, May 26, 2015 consisting of 8-pages.
Ericsson Research Blog, Research, Insights and Technology Reflections, Gabor Fodor, Jul. 10, 2014, "D2D Communications—What Part Will it Play in 5G?", consisting of 5 pages.
ETSI TS 136 101 V12.5.9 (Nov. 2014) Technical Specification LTE; Evolved Universal Terrestrial Radio Access (E-UTRA); User Equipment (UE) Radio Transmission and Reception (4GPP TS 36.101 Version 12.5.0 Release 12), consisting of 538 pages.
4G Americas "Understanding 3GPP Release 12: Standards for HSPA and LTE Enhancements"; Executive Summary Feb. 2015, consisting of 13-pages.

* cited by examiner

WIRELESS SERVICE EXTENSION USING D2D AND METHOD TO DETERMINE COMMUNICATION PATH AND EMERGENCY SERVICE

CROSS-REFERENCE TO RELATED APPLICATIONS

This application is a Submission Under 35 U.S.C. § 371 for U.S. National Stage Patent Application of International Application Number: PCT/IB2017/050495, filed Jan. 30, 2017 entitled "WIRELESS SERVICE EXTENSION USING D2D AND METHOD TO DETERMINE COMMUNICATION PATH AND EMERGENCY SERVICE," the entirety of which is incorporated herein by reference.

TECHNICAL FIELD

This disclosure relates to wireless communication and, in particular to wireless service extension using device to device (D2D) communication.

BACKGROUND

D2D communication has become a growing area of interest in wireless communication, especially 5G, for the added benefits D2D communication provides. Benefits include traffic offloading, increasing spectrum and energy efficiency, and extending wireless communication coverage.

FIG. 1 shows a typical wireless communication network 2 with wireless devices 4 within and outside a coverage area of a base station 6a or 6b, referred to collectively herein as base stations 6. Wireless devices (WDs) 3 include WD-1-C through WD-6-C, and WD-S-C and WD-D-C, where the C indicates that the WDs in FIG. 1 are conventional wireless devices. In this example, WD-S-C, WD-1-C, WD-2-C and WD-4-C are outside the coverage area of base station 6a or 6b. WD-3-C and WD-5-C are within the coverage area of the base station 6a. WD-6-C and WD-D-C are within the coverage area of the base station 6b. In order for WD-S-C to reach WD-D-D, D2D communication may need to be used to form a path between these two wireless devices.

The term wireless device or user equipment (a.k.a. UE) used herein may refer to any type of wireless device communicating with a network node and/or with another wireless device in a cellular or mobile communication system. Examples of a wireless device are target device, device to device (D2D) wireless device, machine type wireless device or wireless device capable of machine to machine (M2M) communication, PDA, iPAD, Tablet, mobile terminals, smart phone, laptop embedded equipped (LEE), laptop mounted equipment (LME), USB dongles etc.

D2D communication was initially proposed in cellular networks as a new paradigm to enhance network performance The emergence of new applications such as content distribution and location-aware advertisement introduced new use-cases for D2D communications in cellular networks. The most popular use-cases of D2D communications are: M2M communication, Content Distribution, Cellular Offloading, Peer-to-Peer Gaming, and Relaying. D2D communication mode however introduces complications in terms of interference control overhead and protocols that are still open research problems. The feasibility of D2D communications in long term evolution (LTE) systems continues to be studied by academia, industry, and the standardization bodies.

The existing solutions describe D2D wireless extensions but do not consider path computation with multiple criteria in their approach. Also, no consideration is given to support of E911 emergency services for a WD with no 3GPP wireless services using D2D infrastructure.

SUMMARY

Some embodiments advantageously provide a method and system for determining a communication path from a source wireless device to a destination device in a wireless communication network. According to one aspect, a method includes discovering, at the source wireless device, wireless devices within communication range of the source wireless device. The method also includes determining, at the source wireless device, for each discovered wireless device, one of whether the discovered wireless device is the destination device and whether the discovered wireless device has wireless connectivity to a wireless base station. The method further includes including each discovered wireless device in a discovered wireless device list, and prioritize the list of discovered wireless devices.

According to this aspect, in some embodiments, the prioritization of the list of discovered wireless devices is such that the destination device is accorded highest priority if the destination device is discovered. Discovered wireless devices having connectivity to a wireless base station are accorded a next highest priority in order of signal strength when at least one discovered wireless device has wireless connectivity to a wireless base station. Discovered wireless devices not having wireless connectivity to a base station are accorded a next highest priority in order of signal strength, when at least one discovered wireless device lacking connectivity to a wireless base station is discovered. In some embodiments, the method further includes sending from the source wireless device a device-to-device (D2D) connection request to a discovered wireless device to attempt establishing communication with the destination device. In some embodiments, the D2D connection request includes at least one of a source service set identifier, S-SSID, a global positioning system, GPS, position, a destination service set identifier, D-SSID, a path list of wireless devices in a path up to the discovered wireless device receiving the D2D connection request and an exclusion list that includes wireless devices that have been predetermined to be unable to reach the destination device and wireless devices for which reachability to the destination device has not been attempted. In some embodiments, the method further includes sending an E911 connection request from the source wireless device to a discovered wireless device for subsequent forwarding to an E911 service. In some embodiments, the method further includes sending an E911 connection request via every wireless device in the path for subsequent forwarding to an E911 service by a wireless device in communication with the wireless base station, the E911 connection request triggering an indication that the wireless device in the path is relaying the E911 connection request. In some embodiments, the E911 connection request includes at least one of a source service set identifier, S-SSID, a global positioning system, GPS, location, a source wireless device phone number, an exclusion list and a path list of wireless devices in path up to the intermediate wireless device. In some embodiments, the method further includes receiving at the source wireless device a connection success message from a discovered wireless device. In some embodiments, when determining a path to the destination device is successful, sending a success message to every device in the path. In some embodiments, when determining a path to the destination device is unsuccessful, sending a failure message to every discovered device.

According to another aspect, a source wireless device configured to determine a communication path from the source wireless device to a destination device in a wireless communication network is provided. The source wireless device includes processing circuitry including a memory and a processor. The memory is configured to store a wireless base station connectivity status of each of a plurality of discovered wireless devices. The processor is configured to discover wireless devices within communication range of the source wireless device. The processor is also configured to determine, for each discovered wireless device, one of whether the discovered wireless device is the destination device and whether the discovered wireless device has wireless connectivity to a wireless base station. The processor is further configured to include each discovered wireless device in a discovered wireless list and prioritize the list of discovered wireless devices.

According to this aspect, in some embodiments, the prioritization of the list of discovered wireless devices is such that the destination device is accorded highest priority if the destination device is discovered. Discovered wireless devices having connectivity to a wireless base station are accorded a next highest priority in order of signal strength when at least one discovered wireless device has wireless connectivity to a wireless base station. Discovered wireless devices not having wireless connectivity to a base station are accorded a next highest priority in order of signal strength, when at least one discovered wireless device lacking connectivity to a wireless base station is discovered. In some embodiments, the processor is further configured to send from the source wireless device a D2D connection request to a discovered wireless device to attempt establishing communication with the destination device. In some embodiments, the D2D connection request includes at least one of a source service set identifier, S-SSID, a global positioning system, GPS, notification, a destination service set identifier, D-SSID, a path list of wireless devices in a path up to the included discovered wireless device and an exclusion list that includes wireless devices that have been predetermined to be unable to reach the destination device and wireless devices for which reachability to the destination device has not been attempted. In some embodiments, the processor is further configured to send an E911 connection request from the source wireless device to a discovered wireless device for subsequent forwarding to an E911 service. In some embodiments, the processor is further configured to send an E911 connection request via every wireless device in the path for subsequent forwarding to an E911 service by a wireless device in communication with the wireless base station, the E911 connection request triggering an indication that the wireless device in the path is relaying the E911 connection request. In some embodiments, the E911 connection request includes at least one of a source service set identifier, SSID, a global positioning system, GPS, notification, a source wireless device phone number, an exclusion list and a path list of wireless devices in path up to a relaying wireless device. In some embodiments, the processor is further configured to receive from the source wireless device a connection success message from the included discovered wireless device. In some embodiments, when determining a path to the destination device is successful, the processor is further configured to send a success message to every device in the path. In some embodiments, when determining a path to the destination device is unsuccessful, sending a failure message to every discovered device.

According to yet another embodiment, a source wireless device configured to determine a communication path from the source wireless device to a destination device in a wireless communication network is provided. The source wireless device includes a memory module configured to store a wireless base station connectivity status of each of a plurality of discovered wireless devices. A discovery module is configured to determine wireless devices within communication range of the source wireless device. A connectivity module is configured to determine, for each discovered wireless device, one of whether the discovered wireless device is the destination device and whether the discovered wireless device has wireless connectivity to a wireless base station. The connectivity module is configured to include each discovered wireless device in a discovered wireless list, and prioritize the list of discovered wireless devices.

According to another aspect, a method in a first intermediate wireless device discoverable by a source wireless device, the first intermediate wireless device configured to attempt to establish communication with a destination device is provided. The method includes discover wireless devices and base stations within communication range of the intermediate wireless device. If the first immediate wireless device is in communication with a wireless base station, the method includes attempting to establish communication with the destination device via the wireless base station. If the first intermediate device cannot establish communication with the destination device via the wireless base station, then the first intermediate device will attempt to establish direct communication with the destination device if the destination device is in the discovery list of the intermediate device. If the first intermediate wireless device cannot communicate directly with the destination device and cannot communicate with the destination device via wireless base station, the method includes attempting to establish communication with the destination device via a second intermediate wireless device that is the next wireless device in the discovered device list of the first intermediate device and is not in an exclusion list of the first intermediate device. When the attempt to establish communication with the destination device via the second intermediate device fails, the second intermediate wireless device is listed in an exclusion list maintained at the first intermediate wireless device so that no further attempt to establish communication with the destination device via the second intermediate wireless device is made.

According to this aspect, in some embodiments, the method further includes receiving an indication that one of the wireless base station and the second intermediate wireless device can establish communication with the destination device. In some embodiments, the method further includes when an attempt to establish communication via the first intermediate device is successful, sending from the first intermediate device a notification of success to the source wireless device via any intermediate wireless devices in an established communication path. In some embodiments, the method further includes receiving from the source wireless device an indication that includes the selected path from the source wireless device to the destination device. In some embodiments, attempting to establish communication with a destination device via a second intermediate wireless device is only performed when the second intermediate wireless device is not in the exclusion list stored at the first intermediate device. In some embodiments, the method further includes receiving an E911 connection request from the source wireless device and displaying an indication of receipt of the E911 connection request, the display containing information enabling the first intermediate device to respond to an E911 emergency. In some embodiments, the method further includes forwarding an E911 connection request to the one of the destination device, the wireless base station and the second intermediate wireless device accessible to the first intermediate device for subsequent forwarding to an E911 service. In some embodiments, the method further includes providing a notification to each wireless device in a communication path from the source wireless device to a base station, the E911 connection request indicating that the wireless device in the path is relaying the E911 connection request. In some embodiments, the E911 connection request includes a source service set identifier, SSID, a global positioning system, GPS, notification, a source wireless device phone number and a path list of wireless devices relaying the E911 connection request.

According to yet another aspect, a first intermediate wireless device discoverable by a source wireless device, the first intermediate wireless device configured to attempt to establish communication with a destination device is provided. The first intermediate wireless device includes processing circuitry including a memory and a processor. The memory is configured to store an exclusion list of neighboring wireless devices not connectable to the destination device. The processor is configured to discover wireless devices and base stations within communication range of the intermediate wireless device. If the first intermediate wireless is in communication with a wireless base station, then establishment of communication with the destination device via the wireless base station is attempted. Otherwise, the first intermediate device will attempt to communicate directly with the destination device if the destination device is in the discovery list of the intermediate device. If the first intermediate wireless device cannot communicate directly with the destination device and cannot communicate with the destination device via the wireless base station, then the processor attempts to establish communication with the destination device via a second intermediate wireless device that is the next wireless device in the discovered device list of the first intermediate device and is not in an exclusion list of the first intermediate device. When the attempt to establish communication with the destination device via the second intermediate wireless device fails, list the second intermediate wireless device in the exclusion list maintained at the first intermediate wireless device so that no further attempt to establish communication with the destination device via the second intermediate wireless device is made.

According to this aspect, in some embodiments, the processor is further configured to receive an indication that one of the wireless base station and the second intermediate wireless device can establish communication with the destination device. In some embodiments, the processor is further configured to, when an attempt to establish communication via the first intermediate device is successful, send from the first intermediate wireless device a notification of success to the source wireless device via any intermediate wireless devices in an established communication path. In some embodiments, the processor is further configured to receive from the source wireless device an indication includes the selected path from the source wireless device to the destination device. In some embodiments, the processor is further configured to attempt to establish communication with a destination device via a second intermediate wireless device only when the second intermediate wireless device is not in the exclusion list stored at the first intermediate device. In some embodiments, the processor is further configured to receive an E911 connection request from the source wireless device and cause display of an indication of receipt of the E911 connection request, the display containing information enabling the first intermediate device to respond to an E911 emergency. In some embodiments, the processor is further configured to forward an E911 connection request to the one of the destination device, the wireless base station and the second intermediate wireless device accessible to the first intermediate device for subsequent forwarding to an E911 service. In some embodiments, the processor is further configured to provide a notification to each wireless device in a communication path from the source wireless device to a wireless base station, the notification indicating that the wireless device in the path is relaying an E911 connection request. In some embodiments, the E911 connection request includes a source service set identifier, SSID, a global positioning system, GPS, notification, a source wireless device phone number and a path list of wireless devices relaying the E911 connection request.

According to another aspect, a first intermediate wireless device discoverable by a source wireless device seeking connection to a destination device is provided. The first intermediate wireless device includes a memory module configured to store an exclusion list of neighboring wireless devices not connectable to the destination device. The first intermediate wireless device also includes a discovery module configured to discover wireless devices and base stations within communication range of the intermediate wireless device. A connectivity module is configured to, if the first immediate wireless device is in communication with a wireless base station, the first intermediate wireless device will attempt to establish communication with the destination device via the wireless base station. If the first intermediate device cannot establish communication with the destination device via the wireless base station, then the first intermediate device will attempt to establish direct communication with the destination device if the destination device is in the discovery list of the intermediate device. If the first intermediate wireless device cannot communicate directly with the destination device and cannot communicate with the destination device via the wireless base station, the first intermediate wireless device will attempt to establish communication with the destination device via a second intermediate wireless device that is the next wireless device in the first intermediate device discovery list and is not in the first intermediate device exclusion list. When the attempt to establish communication with the destination device fails via the second intermediate wireless device, list the second intermediate wireless device in the exclusion list maintained at the first intermediate wireless device so that no further attempt to establish communication with the destination device via the second intermediate wireless device is made.

BRIEF DESCRIPTION OF THE DRAWINGS

A more complete understanding of the present embodiments, and the attendant advantages and features thereof, will be more readily understood by reference to the following detailed description when considered in conjunction with the accompanying drawings wherein.

DETAILED DESCRIPTION

Figure 1:
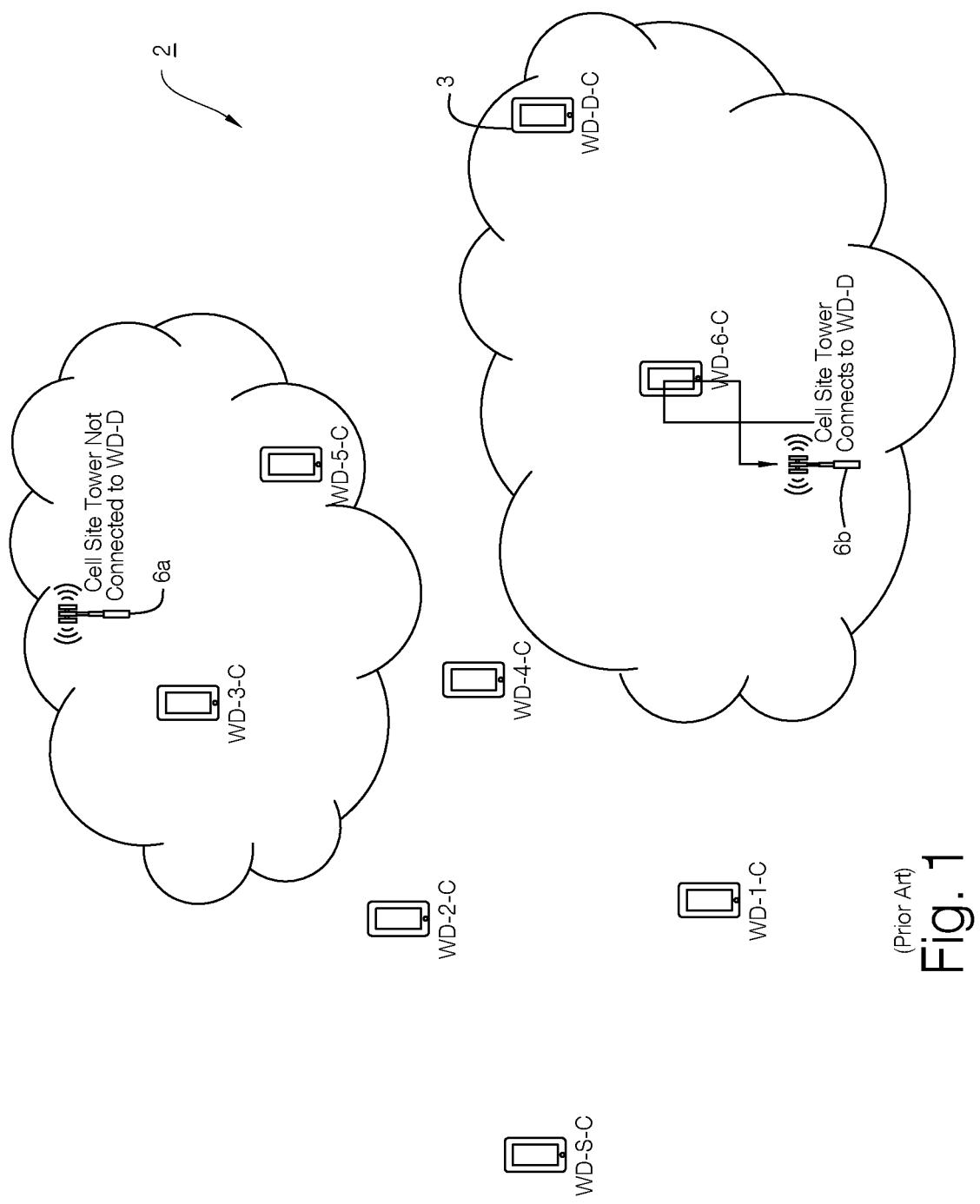
FIG. 1 is a diagram of a wireless network showing wireless devices within and without base station coverage areas.

Before describing in detail exemplary embodiments, it is noted that the embodiments reside primarily in combinations of apparatus components and processing steps related to wireless service extension using device to device (D2D) communication, a method for determining a D2D communication path and a method for E911 emergency service support. Accordingly, components have been represented where appropriate by conventional symbols in the drawings, showing only those specific details that are pertinent to understanding the embodiments so as not to obscure the disclosure with details that will be readily apparent to those of ordinary skill in the art having the benefit of the description herein.

As used herein, relational terms, such as "first" and "second," "top" and "bottom," and the like, may be used solely to distinguish one entity or element from another entity or element without necessarily requiring or implying any physical or logical relationship or order between such entities or elements.

In some embodiments, a method of computing a device to device (D2D) communication path based on device discovery, an ability to identify 3GPP network connected devices and device signal strength is provided. Further, support for E911 emergency services is provided.

Figure 2:
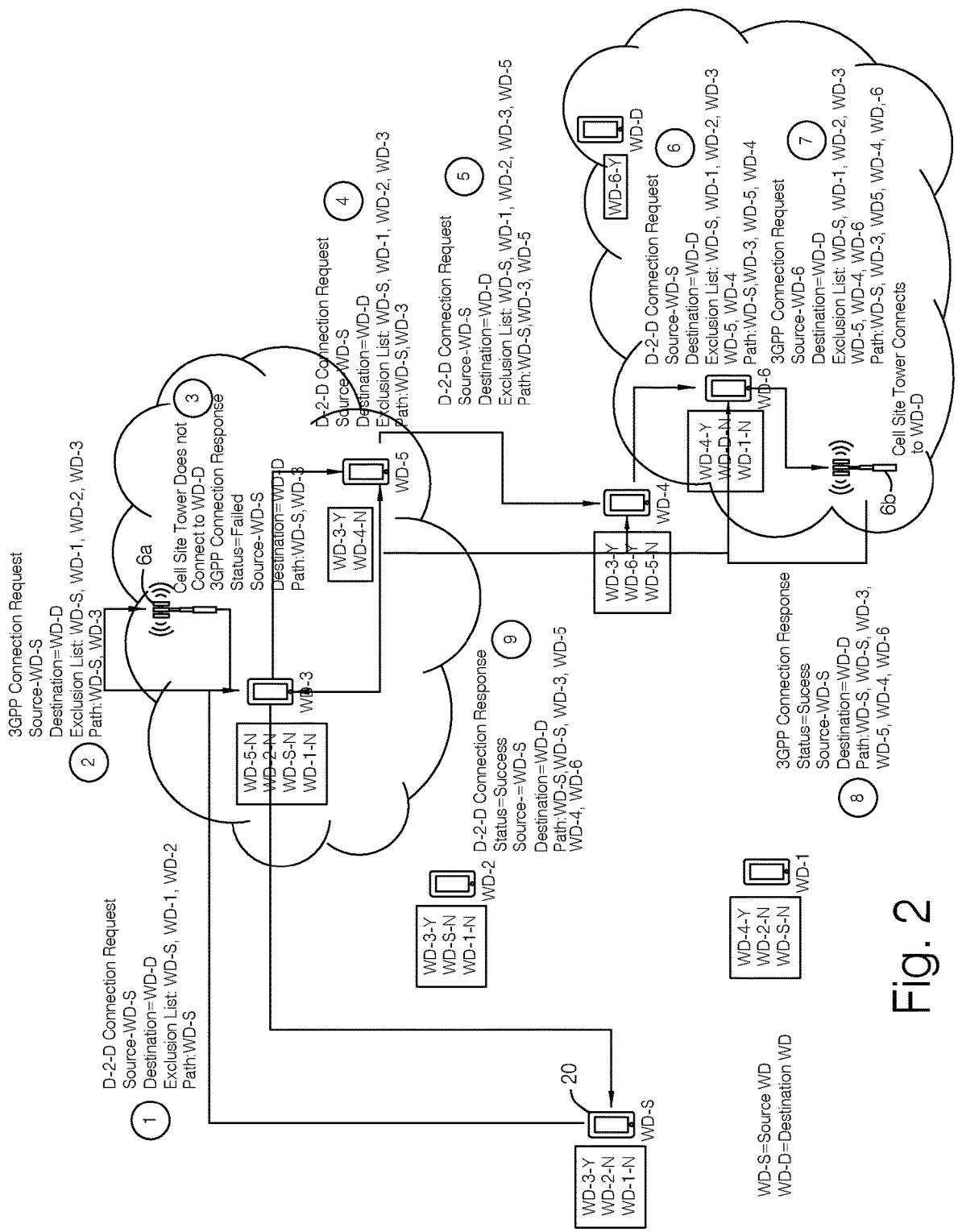
FIG. 2 is a diagram of a first example process for establishing a communication session between a source WD and a destination WD

Referring to FIG. 2, wireless devices (WD) 20 (source wireless device WD-S, intermediate wireless devices WD-1 through WD-6, and destination device WD-D) have discovery capabilities, as well as, D2D capability that may be used in conjunction with wireless base stations, to provide communications that supplement communications provided by conventional networks, alone, as is explained below. More specifically, in a 3GPP system implementing methods described herein, a WD 20 has an ability to discover other wireless devices with D2D capability. The WD 20 discovery information may include information regarding the WD 20's ability to detect a 3GPP network via a base station and to connect to a destination device. Also, E911 emergency initiated sessions may include additional or different information in an E911message sent from the source WD 20 to indicate to a WD 20 in the path and/or a user of the WD 20 in the path that an emergency connection request is being sent. The additional or different information in the E911 connection request may include the source WD 20 phone number and global positioning system (GPS) location of the source WD 20. This information may be displayed on intermediate WDs 20 between the source WD 20 and destination device or between the source WD 20 and a 911 service provider.

Thus, when a source WD 20 sends a discovery request, other WDs 20 within communication range of the source WD 20 will respond with information that includes whether the responding WD 20 has base station connectivity and whether the responding WD has direct connectivity to the destination device. This discovery process may run periodically or continually in the background, or may be triggered when the source WD 20 seeks to connect to the destination device, and may, in some embodiments, be updated periodically thereafter. The source WD 20 may then prepare an ordered list of reachable WDs 20. The WDs 20 may be listed in a discovered device list in order of priority. In one embodiment, the first. i.e., highest, priority is the destination device to which the source WD 20 intends to connect. The second priority is for devices with base station connectivity, ordered within this priority level by strongest signal. Signal strength as used with respect to the second priority herein refers to the signal strength perceived by the source wireless device 20 with respect to a wireless device 20 having base station connectivity. The third priority is for devices without base station connectivity, ordered within this priority level by order of strongest signal. Signal strength as used with respect to the third priority herein refers to the signal strength perceived by the source wireless device 20 with respect to a discovered wireless device. Signal strength is calculated by the source wireless device 20 during the discovery cycle. The source wireless device 20 will assess the strength of the signal received from each wireless device 20 during that cycle. A wireless device having base station connectivity means that the wireless device is within communication range of the base station, i.e., the wireless device is within the coverage area of the base station. Note that when the discovered device list and exclusion list are determined statically, as well as when a path to the destination device cannot be reached, the call session may be dropped and a new discovery session may be initiated. Note that in some embodiments, the discovery process may begin as soon as the WD 20 is awoken by the user of the WD 20, and the discovery process may stop when a connection to a destination device is established.

Embodiments also provide support for handling E911 sessions in the absence of base station connectivity. To provide this support, the source WD 20 must identify that the current session is an E911 session. This identification can be obtained by one of decoding what the WD 20 user is dialing, introducing a new session type specifically for E911 messaging, or introducing a new emergency button on the WD 20.

Thus, support for D2D E911 session handling when a source WD 20 has no base station connectivity is provided. To achieve this, a new session type is defined as an E911 session type. A preferred path for delivering an E911 emergency session message to a network such as a 3GPP session is found by the discovery process and prioritization of intermediate WDs 20, as described above. Also, when the source WD 20 sends an E911 connection request, all WDs 20 in a path are notified and provided data relevant to identity of the source WD 20. This enables each WD 20 in the path to learn about the 911 event at the source WD 20 so that any one of the WDs 20 in the path may respond to the 911 event, even when the E911 message never reaches a destination of an institutional emergency responder. Once a discovered device list and an exclusion list are obtained, they may remain stored until the call session is completed or dropped, or they may remain stored and updated when a next call session is initiated.

The E911 connection request received at an intermediate WD 20 triggers an indication to the intermediate WD 20 that the intermediate WD 20 is relaying the E911 connection request. The intermediate WD 20 may display E911 information which enables a user of the intermediate WD 20 to respond to an E911 event at the source WD. As used herein, the term source WD 20 refers to WD-S, the term destination WD 20 refers to WD-D, and the term intermediate WD 20 refers to any one of WD-1 through WD-6, also referred to as WD-X In order to identify a path between the source WD 20 and the destination device, each WD 20 along the path is enabled to identify its base station connectivity or lack thereof. Further, an exclusion list is maintained that contains the identity of neighboring WDs 20 that cannot reach the destination device and WDs 20 for which reachability to the destination device has not been attempted, including WDs 20 having connectivity to a base station that cannot reach the destination device. In some embodiments, the source WD 20 may include in its exclusion list all discovered devices in its discovered device list except for the current wireless device through which the source WD 20 is attempting to connect to the destination device. Maintenance of the exclusion list provides optimized connection path discovery efficiency and prevents message flooding. Once a connection to the destination device by the WD 20 is tried and failed, the WD 20 is placed in an exclusion list so that it is no longer used to try to connect to the destination device. Thus, an exclusion list of a WD 20 may contain all WDs 20 from the discovered device list of the WD 20 less the WD 20 or WDs 20 that are deemed capable of reaching the destination device. This exclusion list may be updated periodically or continually to account for change of connectivity status of intermediate devices. Alternatively, the exclusion lists—as well as the discovered device lists—may be static during the call session requested by the source WD 20 and if an intermediate WD 20 loses connectivity, because, for example it is no longer in range, the call session may be dropped and reestablished along a different path.

The embodiments described herein for D2D path finding can be understood by way of examples. Consider the situation depicted in FIG. 2 in which a WD-S (source wireless device) seeks to communication with a WD-D (destination wireless device). In FIG. 2, steps of the process are numbered in circles with a label identifying the process step, the source wireless device, the destination wireless device, the wireless devices in the exclusion list and the wireless devices in the path up to that point. The boxes next to each WD is the prioritized discovery list for the WD which indicates whether the WD in the list has base station connectivity (Yes or No). The wireless devices in FIGS. 2, 3 and 4 may be denoted generally as wireless devices 20. The naming convention "WD-x" is used to identify and refer to a specific wireless device 20 for ease of understanding.

Thus, WD-S has no base station connectivity but is in communication range with WD-1, WD-2 and WD-3. Of these, only WD-3 reports having base station connectivity. Since, WD-3 has a higher priority than WD-1 and WD-2, by virtue of its base station connectivity, the WD-S connects to WD-3. (FIG. 2, Step 1). WD-3 will attempt to connect to WD-D via the base station 6a to which WD-3 has connectivity. (FIG. 2, Step 2). Note that base stations 6a, and 6b, may be referred to collectively herein as base stations 6. However, since the coverage area of base station 6a does not include WD-D, the base station informs WD-3 that a network connection to WD-D has failed. (FIG. 2, Step 3). WD-3 then attempts and succeeds at connecting with WD-5 which is in WD-3's connection list and not in WD-3's exclusion list. (FIG. 2, Step 4). Note that WD-3 is in WD-5's exclusion list because it has been determined to lack connectivity to WD-D.

Consequently, WD-5 will seek connection to WD-4 because WD-4 is within range and not on WD-5's exclusion list, and because there is no other WD having base station connectivity. (FIG. 2, Step 5). WD-4 is not on WD-5's exclusion list because it has not been determined that WD-4 has no connectivity to a base station or WD-D. WD-4 is outside the range of any base station and looks for a WD that has base station connectivity. This leads WD-4 to connect to WD-6, which does have connectivity to base station 6b. (FIG. 2, Step 6). WD-6 will attempt to connect to WD-D via the base station 6b and succeeds. (FIG. 2, Step 7). This success is reported to WD-6, WD-4, WD-5, WD-3 and WD-S, in other words, to each WD in the determined path. (FIG. 2, Steps 8 and 9).

Figure 3:
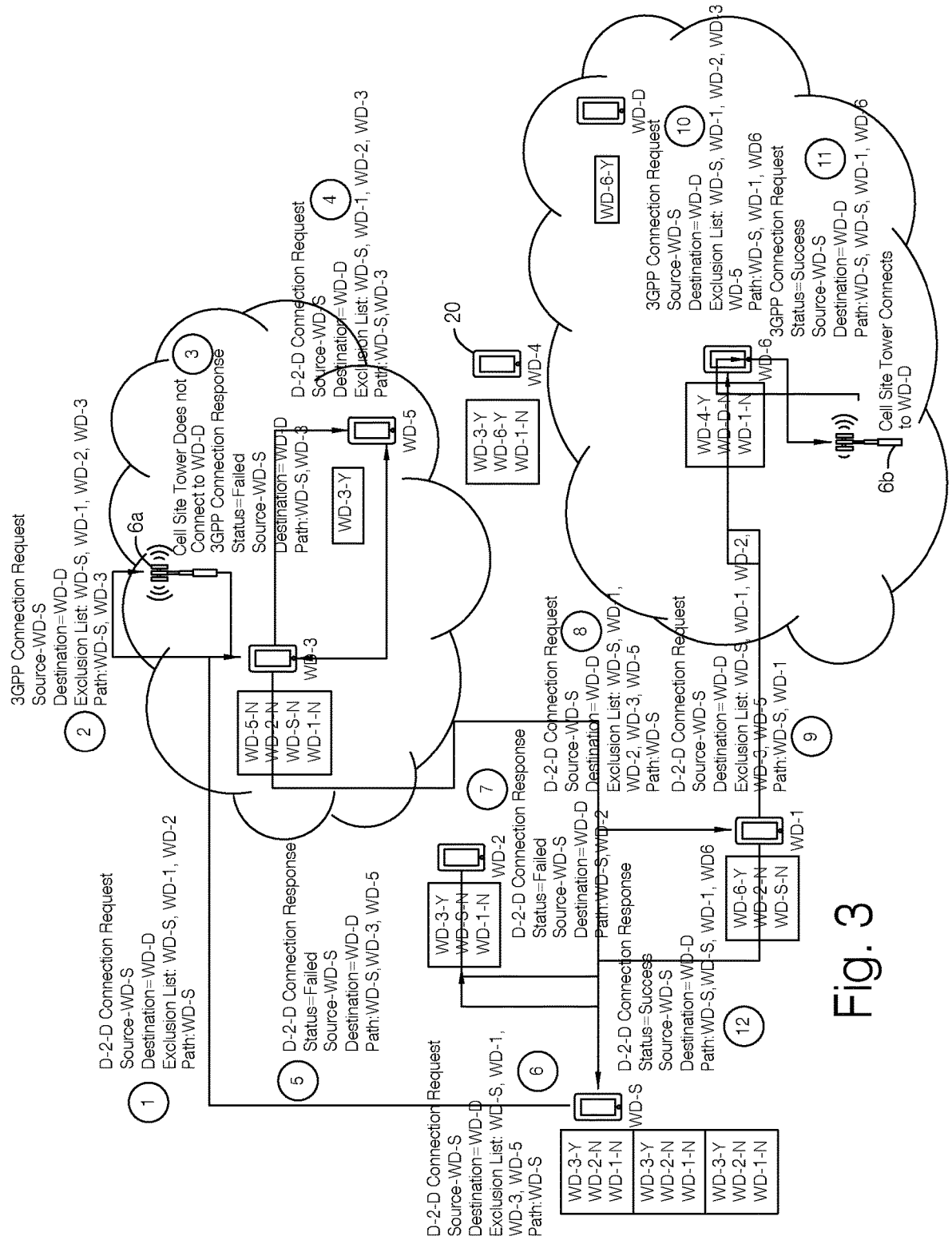
FIG. 3 is a diagram of a first example process for establishing a communication session between a source WD and a destination WD.

FIG. 3 depicts another example of D2D path determination from a source WD to a destination device in the specific case that WD-4 is not within the range of WD-5. As in the previous example, WD-S connects to WD-3 since it has priority by virtue of having base station connectivity. (FIG. 3, Step 1). As before, WD-3 attempts to connect to WD-D via the base station 6a. (FIG. 3, Step 2). This attempt fails because WD-D is not within the coverage area of the base station 6a. (FIG. 3, Step 3). In this event, WD-3 attempts to connect to WD-5 because it is within WD-3's discovery list. (FIG. 3, Step 4) But WD-5 does not have connectivity to WD-D either directly or via base station 6a. Thus, the failure to connect via WD-5 is reported to WD-3 and to WD-S. (FIG. 3, Step 5).

Thus, since a connection to WD-D cannot be obtained via WD-3, which was at the top of WD-S's priority list, WD-S attempts to connect to WD-D via WD-2, which is next on WD-S's priority list. (FIG. 3, Step 6). WD-2 will report back to WD-S that the connection failed since WD-2 cannot reach WD-D. (FIG. 3, Step 7). Since WD-2 cannot link WD-S to WD-D, the WD-S turns to WD-1, which is next in its prioritized list of discovered WDs. (FIG. 3, Step 8). WD-1 connects to WD-6 which is at the top of its prioritized list because WD-6 was determined to have base station connectivity. (FIG. 3, Step 9). WD-6 will attempt to connect to WD-D via the base station 6b. (FIG. 3, Step 10). Base station 6b will connect to WD-D because WD-D is within the coverage area of base station 6b. (FIG. 3, Step 11). Connection success is transmitted to WD-6, WD-1 and WD-S. (FIG. 3, Step 12).

Figure 4:
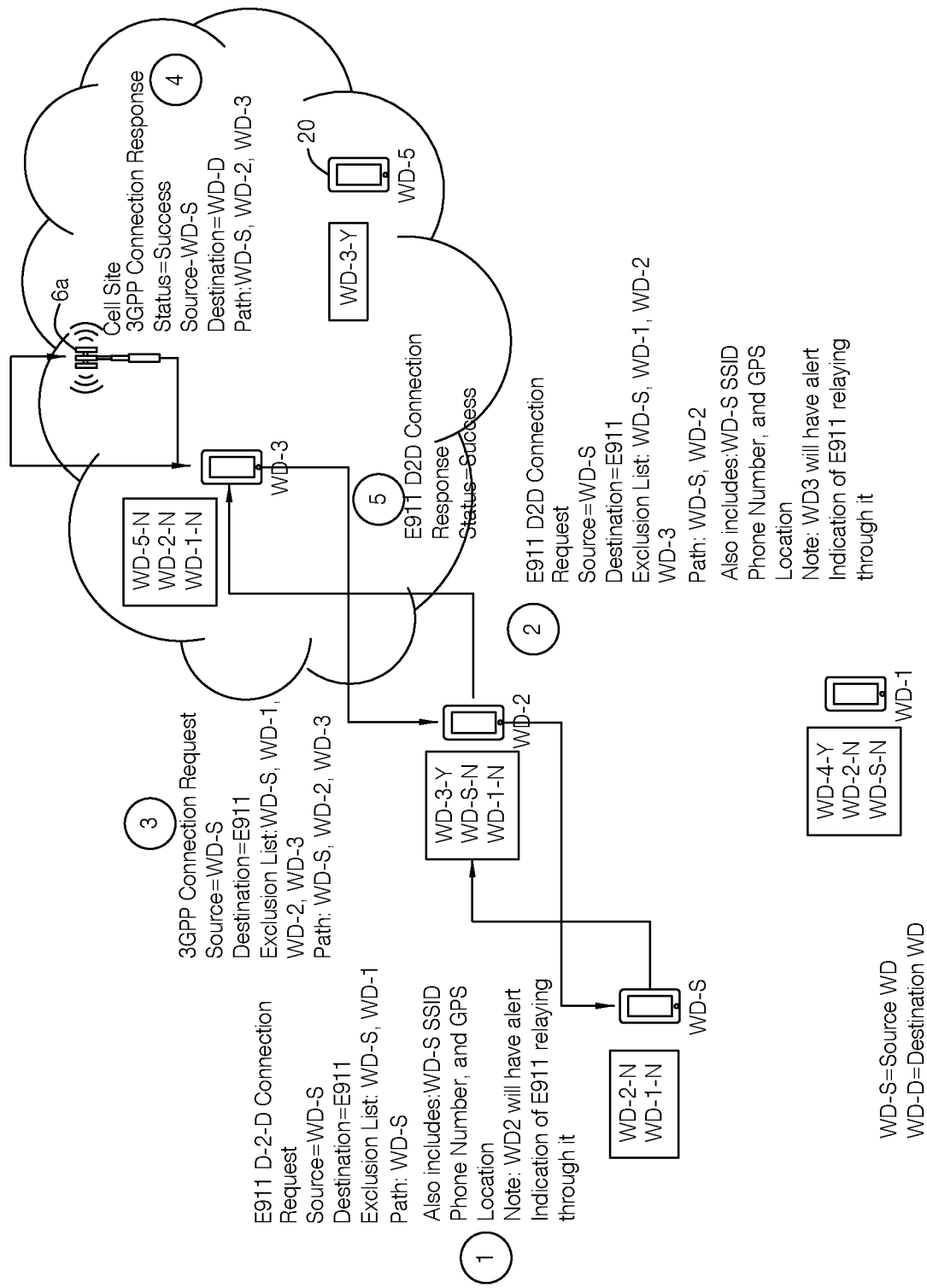
FIG. 4 is a diagram of an example process for establishing an E911 session.

FIG. 4 shows an example of path determination for an E911 emergency message when the source WD does not have direct connectivity with a base station. First, the WD-S detects that it is in an E911 communication session in which the WD-S seeks E911 service by sending an E911 connection request. (FIG. 4, Step 1). In this example, the WD-S connects to WD-2 as it is the first WD 20 in its prioritized discovered device list. (FIG. 4, Step 2). Since this is an E911 connection, a display on WD-2 may indicate that this is an E911 connection. WD-2 connects to WD-3 since it is first in the prioritized discovery list of WD2. (FIG. 4, Step 3). WD-3 is first in the list WD-2's discovery list by virtue of the base station connectivity of WD-3. A display on WD-3 indicates that this is an E911 connection. WD-3 attempts to establish the E911 session through the base station 6*a,* which is successful. (FIG. 4, Step 4). Connection success is reported to WD-3, WD-2 and WD-S. (FIG. 4, Step 5). Note that the E911 display on each WD may include the phone number and/or GPS location of WD-S. Thus, regardless of whether connectivity to the network via the base station 6*a* is possible, the intermediate WDs, WD2 and WD3, are notified of the emergency status of the user of WD-S.

A general overview of the methods described above can be summarized as follows.

1. A source WD 20, e.g., WD-S, starts a communication session which can be, for example, a data or voice session or an E911 session.

2. WD-S determines if it has base station connectivity. The base station may be part of a 3GPP network. If WD-S does have base station connectivity, then WD-S seeks connection to the destination device via the base station in the case of a non-E911 communication and seeks connection to a 911 service provider in the case of an E911 communication.

3. If WD-S does not have base station connectivity, or if WD-S does have base station connectivity but cannot reach the destination device via the base station 6*a* or 6*b,* WD-S begins WD discovery. This discovery process may not be visible to the user. Discovery involves determining which WDs 20 are in communication range of WD-S, which of those WDs 20 have base station connectivity, and which WDs 20 have the strongest signals. A prioritized discovered device list is prepared. The first WD 20 in the list is the destination device if it is discovered. The next WDs 20 on the list are the one or more WDs 20 that have base station connectivity, listed in order of highest signal strength. Next in the list are WDs 20 that do not have base station connectivity, listed in order of highest signal strength. A measure of signal strength may be, for example, a received signal strength indicator (RSSI).

4. If the session is an E911 session, the source WD 20, e.g., WD-S, will repeat the following process for each WD 20 in the prioritized discovery list until a connection to destination is achieved or finally fails.
   a. WD-S connects to an intermediate WD 20, WD-X, in the list and provides the following information to the intermediate WD-X: Source WD service set identification (S-SSID), GPS location, Source WD phone number, a path list of WDs in the path up to the intermediate device and an exclusion list. The existence of the E911 session may be displayed on the intermediate WD 20, WD-X.
   b. If the intermediate WD 20, WD-X, has base station connectivity, then the intermediate WD 20, WD-X, attempts to connect to a destination via the base station following network standards and radio access network connection management rules.
   c. If the intermediate WD 20, WD-X, does not have base station connectivity, the intermediate device 20, WD-X, will execute the discovery process to discover WDs 20 in communication range which are not in the intermediate WD's exclusion list and will add the source WD 20 to the exclusion list in the D2D connection request. The intermediate WD 20, WD-X, will also update the path list by adding itself to the path.

5. If the session is not an E911 session, the source WD 20, WD-S, will repeat the following process for each WD 20 in its prioritized discovered device list until a connection to the destination is established or finally fails.
   a. WD-S will connect to the WD 20 at the top of the discovered device list and provide at least some of the following information elements to this intermediate WD 20, WD-X: Source SSID (S-SSID), GPS location, destination SSID (D-SSID), path list known to this point, and an exclusion list of WDs 20 that have been predetermined to be unable to reach the destination device. In one embodiment, the S-SSID, D-SSID, path list and exclusion list are sent. If the intermediate WD is actually the destination device, then the session is established.
   b. If the intermediate WD 20, e.g., WD-X, is not the destination device, then if the intermediate WD WD-X has base station connectivity, then the intermediate WD WD-X attempts to connect to the destination device via the base station following network standards and radio access network connection management rules. As noted above, WD-X denotes an intermediate device, such as intermediate devices WD-1 through WD-6.
   c. If the intermediate WD 20, WD-X, does not have base station connectivity, then the intermediate device 20, WD-X, will execute the discovery process to discover WDs in communication range which are not in the intermediate WD's exclusion list and will add WD-S to the exclusion list in the D2D connection request. The intermediate WD 20, WD-X, will also update the path list by adding itself to the path.

Figure 5:
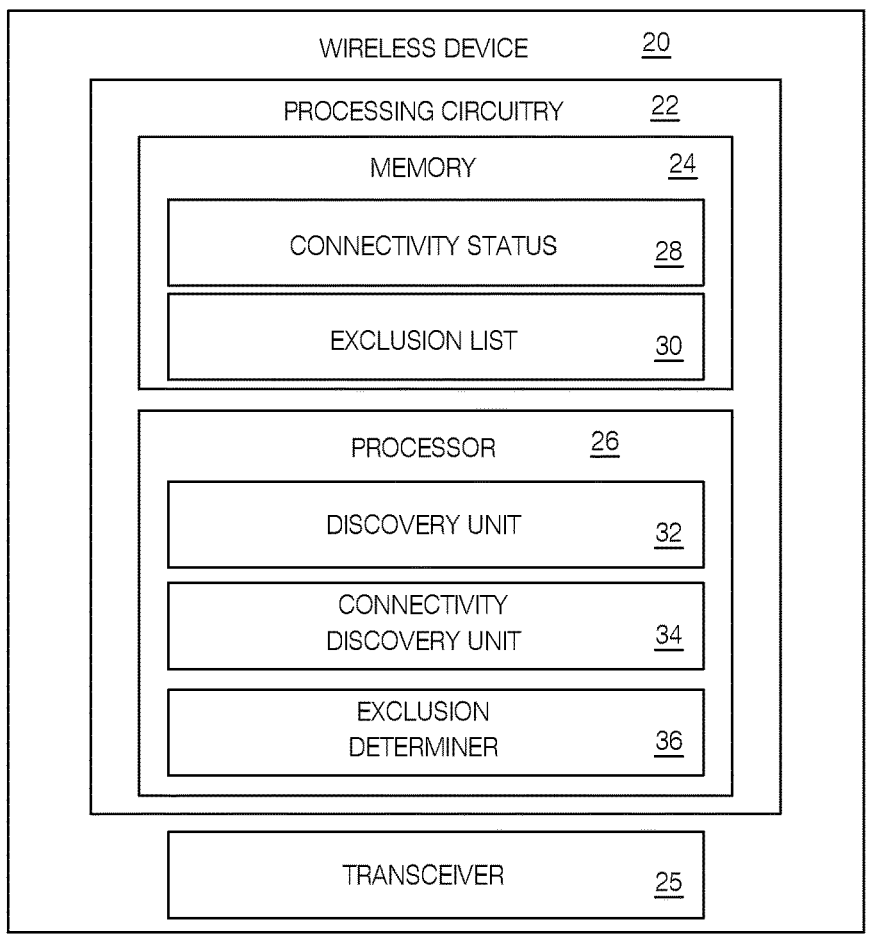
FIG. 5 is a block diagram of a wireless device constructed according to principles set forth herein.

FIG. 5 is a block diagram of a wireless device 20 corresponding to any of the wireless devices 20 shown in FIGS. 2, 3 and 4. WD 20 includes processing circuitry 22 having a memory 24 and a processor 26, the memory 24 containing instructions which, when executed by the processor 26, configure processor 26 to perform the one or more functions described herein. In addition to a traditional processor and memory, processing circuitry 22 may include integrated circuitry for processing and/or control, e.g., one or more processors and/or processor cores and/or FPGAs (Field Programmable Gate Array) and/or ASICs (Application Specific Integrated Circuitry).

Processing circuitry 22 may include and/or be connected to and/or be configured for accessing (e.g., writing to and/or reading from) memory 24, which may comprise any kind of volatile and/or non-volatile memory, e.g., cache and/or buffer memory and/or RAM (Random Access Memory) and/or ROM (Read-Only Memory) and/or optical memory and/or EPROM (Erasable Programmable Read-Only Memory). Such memory 24 may be configured to store code executable by control circuitry and/or other data, e.g., data pertaining to communication, e.g., configuration and/or address data of nodes, etc. Processing circuitry 22 may be configured to control any of the methods described herein and/or to cause such methods to be performed, e.g., by processor 26. Corresponding instructions may be stored in the memory 24, which may be readable and/or readably connected to the processing circuitry 22. In other words, processing circuitry 22 may include a controller, which may comprise a microprocessor and/or microcontroller and/or FPGA (Field-Programmable Gate Array) device and/or ASIC (Application Specific Integrated Circuit) device. It may be considered that processing circuitry 22 includes or may be connected or connectable to memory, which may be configured to be accessible for reading and/or writing by the controller and/or processing circuitry 22.

The memory 24 is configured to store base station connectivity status 28 of the WD 20, and exclusion list 30. As noted above, the exclusion list 30 includes the identities of the WDs 20 in the network that have been determined not to have connectivity to the destination device. The memory 24 may also be configured to store path list, E911 connection request content, and prioritized discovery list.

The processor 26 implements a discovery unit 32 configured to discover other wireless devices 20 within communication range of the wireless device 20. A connectivity discovery unit 34 implemented by the processor 26 is configured to determine, for each discovered wireless device 20, whether the discovered wireless device is the destination wireless device 20 and whether the discovered wireless device has connectivity to a wireless base station. The discovery unit 32 may also prioritize the discovered device list as explained above. The discovery unit 32 may cause the transceiver 25 to communicate discovery requests to neighboring WDs 20 and receive responses from the neighboring WDs 20.

When acting as an intermediate wireless device WD-X, the processor 26 determines, via implementation of the connectivity discovery unit 34, the base station connectivity status of the intermediate wireless device WD-X. If the intermediate wireless device WD-X has wireless base station connectivity, the processor 26 is configured to attempt to connect to the destination device via the wireless base station. Otherwise, the processor 26 is configured to attempt to connect to the destination device via a second intermediate wireless device 20. Communication to other WDs 20 and to a base station is via a transceiver 25 of the wireless device 20. The processor 26 is further configured to implement an exclusion determiner 36 configured to list a neighboring intermediate wireless device WD-X in an exclusion list if it is determined that the neighboring intermediate wireless device WD-X cannot reach the destination device either directly, via a base station, or via another wireless device 20.

Figure 6:
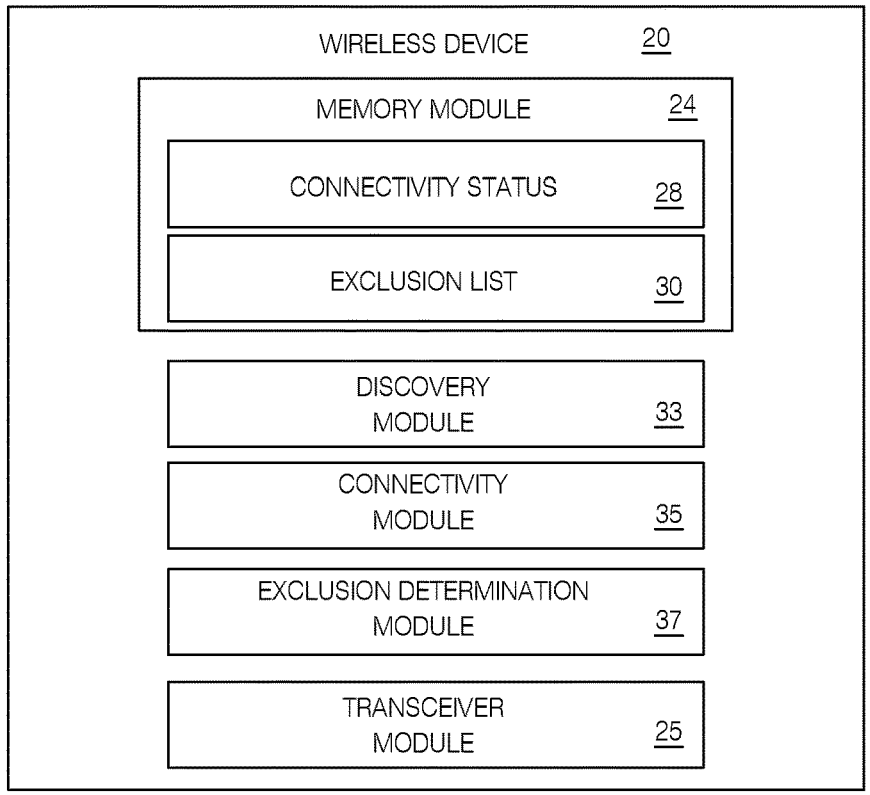
FIG. 6 is a block diagram of an alternative wireless device constructed according to principles set forth herein.

FIG. 6 is a block diagram of an alternative embodiment of the wireless device 20, which may be implemented as a computer program having software that, when executed by a processor, determines a path to a destination device. The software modules include a discovery module 33 configured to cause the processor to discover wireless devices 20 within communication range of the source wireless device 20, WD-S. A connectivity module 35 is configured to cause the processor to determine, for each discovered wireless device 20, whether the discovered wireless device 20 is the destination device and whether the discovered wireless device 20 has connectivity to a wireless base station.

When acting as an intermediate wireless device WD-X, the processor determines, via implementation of the connectivity module 35, the base station connectivity status of the intermediate wireless device WD-X. If the intermediate wireless device WD-X has wireless base station 6a, 6b connectivity, the processor 26 is configured to attempt to connect to the destination device via the wireless base station 6a, 6b. Otherwise, the processor 26 is configured to attempt to connect to the destination device via a second intermediate wireless device 20.

The processor is further configured by the exclusion determination module 37 to list a neighboring intermediate wireless device 20, WD-X, in an exclusion list if the neighboring intermediate wireless device 20, WD-X, cannot reach the destination device. The transceiver module may be partially implemented in software to effectuate wireless communication by the wireless device 20.

Figure 7:
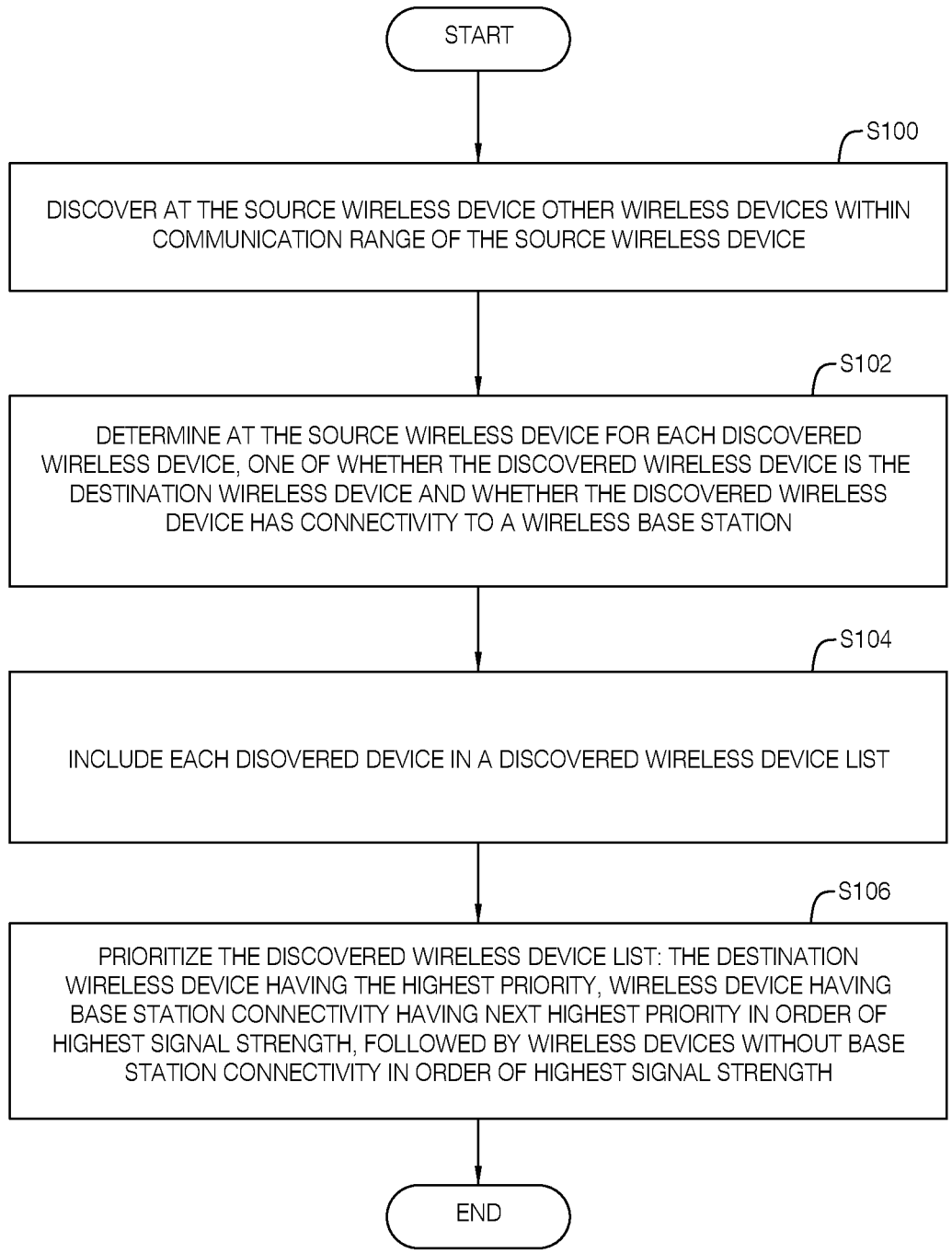
FIG. 7 is a flowchart of an exemplary process for generating a prioritized discovery list in order to facilitate determination of a communication path between a source WD and a destination device in a D2D network.

FIG. 7 is a flowchart of an exemplary process for generating a prioritized discovered device list in order to facilitate determination of a path between a source WD 20, e.g., WD-S, and a destination device in a D2D network. The process includes discovering by a discovery unit 32 of a source wireless device, WD-S, other wireless devices 20 within communication range of the source wireless device WD-S (block S100). The process also includes, determining by the connectivity discovery unit 34 of the source wireless WD-S for each discovered wireless device 20, one of whether the discovered wireless device 20 is the destination device and whether the discovered wireless device 20 has connectivity to a wireless base station 6a, 6b (block S102). Each discovered device is included in a discovered wireless device list (block S104). The process also includes the connectivity discovery unit 34 of source wireless device 20, WD-S, prioritizing the discovered wireless device list. The prioritization is according to the following order: the destination device followed by intermediate wireless devices, WD-X, having wireless base station connectivity in order of highest signal strength followed by intermediate wireless devices 20, WD-X, without base station connectivity in order of highest signal strength (block S106).

Figure 8:
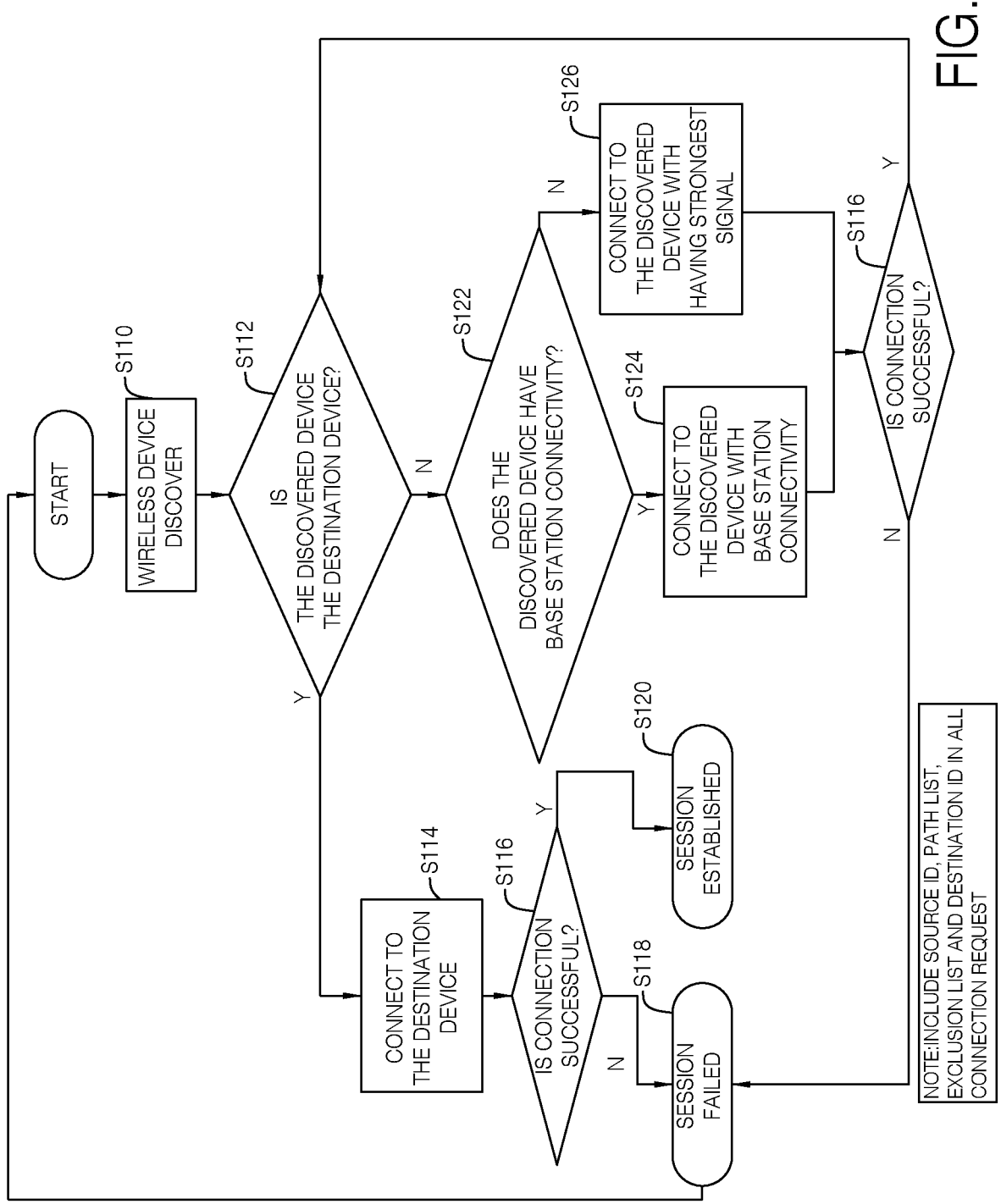
FIG. 8 is a flowchart of an exemplary process for communication path discovery from a source WD to a destination device.

FIG. 8 is a flowchart of an exemplary process for path discovery from a source WD 20, WD-S, to a destination device. The process includes performing, via the discovery unit 32, WD discovery at the source WD-S or intermediate WD-X (block S110) by sending a connection request via the transceiver 25 of the requesting device. For each discovered WD 20, a determination is made by way of the connectivity discovery unit 34 of the requesting device whether the discovered WD 20 is the destination device (block S112). If the discovered WD 20 is the destination device, then the process includes the requesting device attempting to connect to the destination device via the transceiver 25 (block S114). If the connection is not successful (block S116), then the communication session is deemed to have failed by the requesting device (block S118). If the connection is successful (block S116), then the communication session is established (block S120). Returning to block S112, if the discovered WD 20 is not the destination device, then the discovered device is an intermediate device WD-X, and the process includes determining via the connectivity discovery unit 34 of the discovered device, WD-X, whether the discovered device, WD-X, has base station connectivity (block S122). If the discovered WD-X does have base station connectivity (block S122) (and is not in the exclusion list) then the attempt is made to connect to the discovered WD-X (block S124). If the connection is successful (block S116), the process continues at block S112. If the connection is not successful (block S116), the process moves to block S118, where the session is deemed by the requesting device to have failed. Returning to block S122, if the discovered WD-X does not have base station connectivity, then the WD-X that does not have base station connectivity is added to the exclusion list of the requesting device by the exclusion determine 36. Then an attempt is made to connect, via the transceiver 25, to the discovered WD-X having the strongest signal (block S126) (that is not in the exclusion list). If the connection is successful (block S116), the process continues at block S112. Note that in some embodiments, in the connection attempts represented by blocks S114, S124 and S126, the connection request forwarded to the discovered device includes at least S-SSID, path list, exclusion list and D-SSID.

Figure 9:
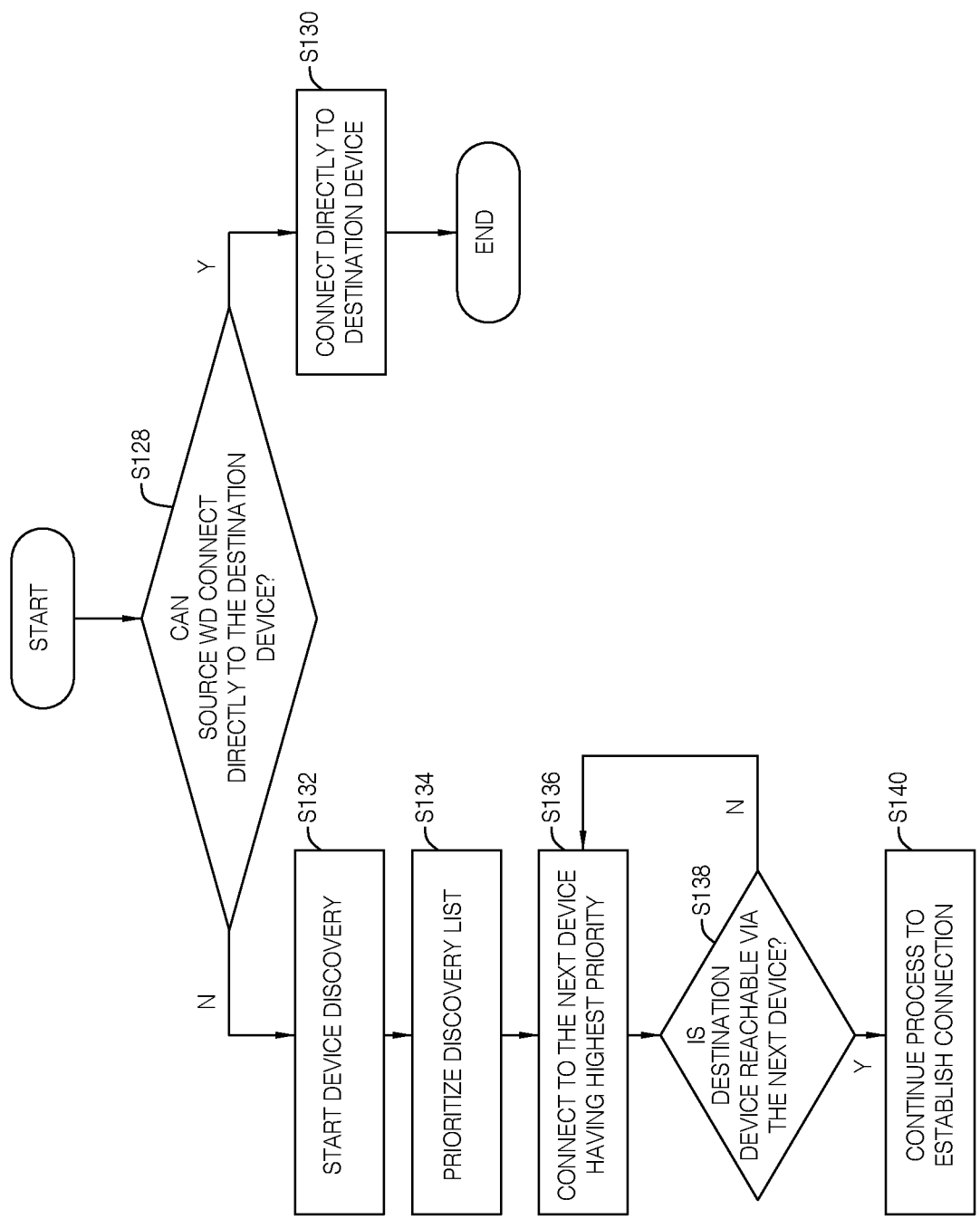
FIG. 9 is a flowchart of an exemplary process for establishing a communication path between the source WD and the destination device.

FIG. 9 is a flowchart of an exemplary process for establishing a path between the source WD 20, WD-S, and the destination device. The process includes determining, via the connectivity discovery unit 34, whether the source WD 20, WD-S, can connect directly to the destination device (block S128). If the source WD 20, WD-S, can connect directly to the destination device then WD-S connects to the destination device via the transceiver 25 (block S130). Otherwise, WD-S begins, via the discovery unit 32, device discovery (block S132) to generate a discovered device list. This discovered device list is prioritized according to the priority rules explained above by connectivity discovery unit 34 (block S134). Then, WD-S connects, via transceiver 25, to the next device, which is an intermediate WD, WD-X, having highest priority (block S136) (that is not in the exclusion list). The connectivity discovery unit 34 then determines whether the destination device is reachable by way of the next device WD-X (block S138). If not, the process continues at block 136, where connection via the transceiver 25 is attempted via the next device WD-X in the discovered device list (that is not in the exclusion list). Otherwise, the process continues to establish connection to the current discovering device (block S140).

Figure 10:
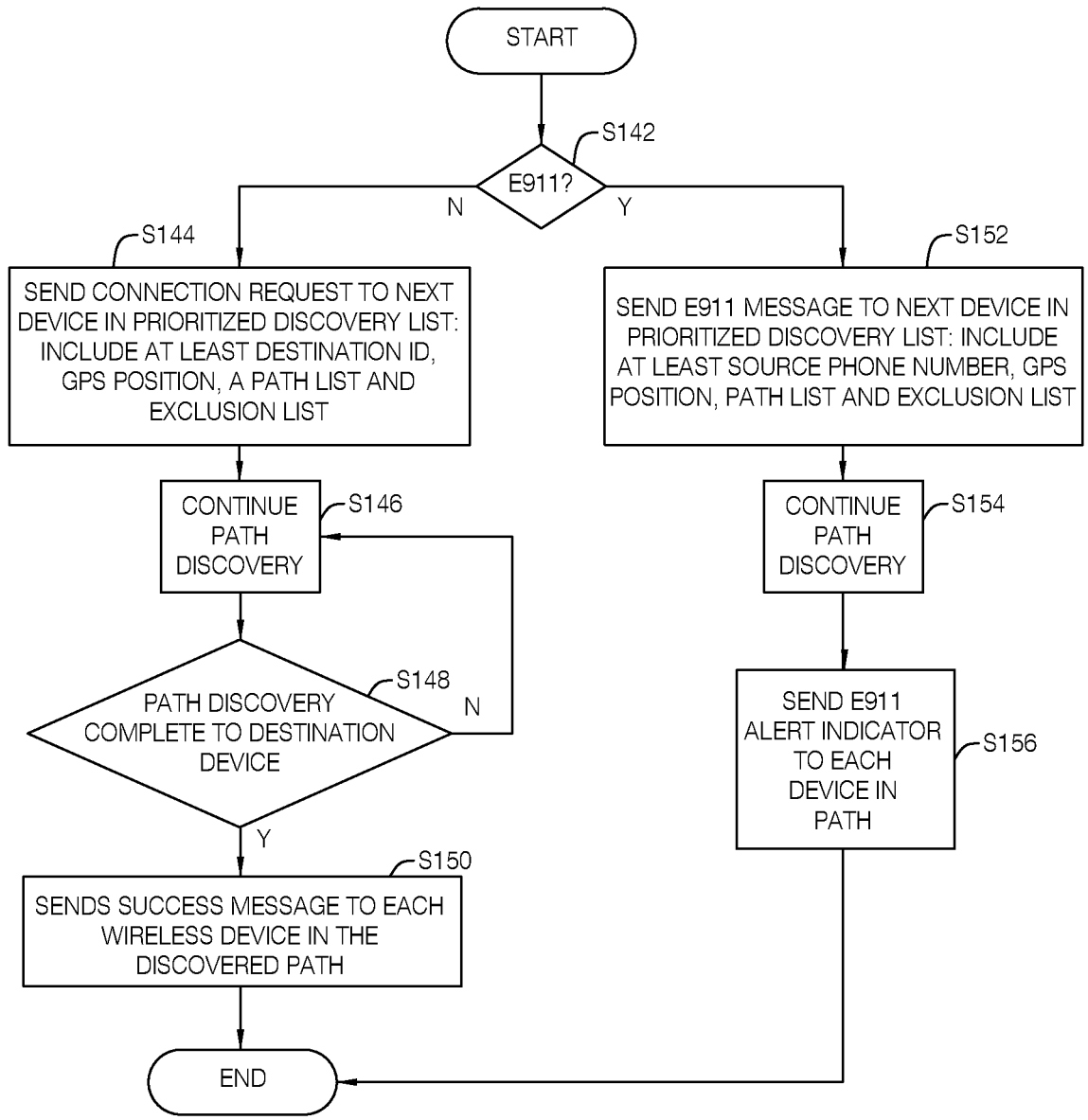
FIG. 10 is a flowchart of an exemplary process for establishing a communication path in the event of a non-E911 session and in the event of an E911 session.

FIG. 10 is a flowchart of an exemplary process for establishing a path in the event of a non-E911 session and in the event of an E911 session. The process includes determining, via the processing circuitry 22, if the communication session to be established is or is not an E911 session (block S142). This can be detected by the source device WD-S as explained above, or can be detected by an intermediate WD WD-X by receiving the E911 connection request from the previous WD in the path. If the session to be established is not an E911 session, then a connection request is sent via the transceiver 25 to the next device WD-X in a prioritized discovered device list, in some embodiments, the request including at least a D-SSID, GPS location, path list and exclusion list (block S144). Path discovery then continues (block S146). The information included in the connection request may require an extension to existing $3^{rd}$ generation partnership project (3GPP) standards. If path discovery is complete to the destination device (block S148), then a success message is sent via the transceiver 25 to each wireless device in the discovered path (block S150). Otherwise, path discovery continues (block S146).

Returning to block S142, if the session is an E911 session, then an E911 connection request is sent via the transceiver 25 to the next device in the prioritized discovery list. In one embodiment, the E911 connection request includes at least the source phone number, GPS location, path list and exclusion list (block S152). The E911 connection request can include fewer or additional information elements than those described. Path discovery then continues (block S154), and an E911 alert indication is sent to each device in the path (block S156) to be displayed by each WD 20 (or alerted by the WD 20 to the user) in the path. This is helpful when a lack of connectivity interferes with connection to a 911 service provider.

In one embodiment, existing 3GPP standards can be extended to include the information included in the E911 connection request. Note that in both types of sessions—non-E911 sessions and E911 sessions—the exclusion list is used to reduce or avoid message flooding, by preventing the connection request or E911 connection request from being forwarded to devices that have already been determined to lack reachability to the destination device.

Note that when a WD 20 receives a connection request it should send an acknowledgement to the WD 20 sending the connection request. The acknowledgment should indicate success or failure within a predetermined period of time. Otherwise, the connection may be deemed to have failed. Once connection to the destination device has been completed a success message may be sent to every WD 20 in the connection path back to the source WD 20, e.g., WD-S. Similarly, if the network fails to determine a path to a destination device, a failure message may be sent to every discovered WD 20, WD-X, in the path.

In the case of an E911 session establishment attempt, one embodiment includes sending an E911 connection request via every wireless device 20 in the path for subsequent forwarding to an E911 service by a wireless device 20 in communication with the wireless base station, the E911 connection request triggering an indication that the wireless device 20 in the path is relaying the E911 connection request.

Thus, some embodiments described above extend wireless coverage beyond current 3GPP standards for D2D communication in the absence of 3GPP coverage for a source WD. The communication path for reaching the destination device is predicated on placing priority on connections that include WDs 20 under 3GPP network management. Further, improved E911 and emergency service can be provided to wireless users who have no 3GPP wireless service by incorporating the WD source number and location in a D2D connection request which can be seen by all intermediate wireless devices.

As will be appreciated by one of skill in the art, the concepts described herein may be embodied as a method, data processing system, and/or computer program product. Accordingly, the concepts described herein may take the form of an entirely hardware embodiment, an entirely software embodiment or an embodiment combining software and hardware aspects all generally referred to herein as a "circuit" or "module." Furthermore, the disclosure may take the form of a computer program product on a tangible computer usable storage medium having computer program code embodied in the medium that can be executed by a computer. Any suitable tangible computer readable medium may be utilized including hard disks, CD-ROMs, electronic storage devices, optical storage devices, or magnetic storage devices.

Some embodiments are described herein with reference to flowchart illustrations and/or block diagrams of methods, systems and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, (thereby creating a special purpose computer), special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable memory or storage medium that can direct a computer or other programmable data processing apparatus to function in a particular manner, such that the instructions stored in the computer readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks. It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved. Although some of the diagrams include arrows on communication paths to show a primary direction of communication, it is to be understood that communication may occur in the opposite direction to the depicted arrows.

Computer program code for carrying out operations of the concepts described herein may be written in an object oriented programming language such as Java® or C++. However, the computer program code for carrying out operations of the disclosure may also be written in conventional procedural programming languages, such as the "C" programming language. The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

Many different embodiments have been disclosed herein, in connection with the above description and the drawings. It will be understood that it would be unduly repetitious and obfuscating to literally describe and illustrate every combination and subcombination of these embodiments. Accordingly, all embodiments can be combined in any way and/or combination, and the present specification, including the drawings, shall be construed to constitute a complete written description of all combinations and subcombinations of the embodiments described herein, and of the manner and process of making and using them, and shall support claims to any such combination or subcombination.

It will be appreciated by persons skilled in the art that the embodiments described herein are not limited to what has been particularly shown and described herein above. In addition, unless mention was made above to the contrary, it should be noted that all of the accompanying drawings are not to scale. A variety of modifications and variations are possible in light of the above teachings without departing from the scope of the following claims.

What is claimed is:

1. A discovery method for determining a communication path from a source wireless device (WD-S) to a destination device in a wireless communication network, the method comprising:
   discovering, at the source wireless device (WD-S), wireless devices within communication range of the source wireless device (WD-S);
   determining, at the source wireless device (WD-S), for each discovered wireless device, one of whether the discovered wireless device is the destination device and whether the discovered wireless device has wireless connectivity to a wireless base station;
   including each discovered wireless device in a discovered wireless device list; and
   prioritizing the list of discovered wireless devices, wherein the prioritization of the list of discovered wireless devices is such that:
   the destination device is accorded highest priority if the destination device is discovered; and
   discovered wireless devices having connectivity to a wireless base station are accorded a next highest priority in order of signal strength when at least one discovered wireless device has wireless connectivity to a wireless base station; and
   discovered wireless devices not having wireless connectivity to a base station are accorded a next highest priority in order of signal strength, when at least one discovered wireless device lacking connectivity to a wireless base station is discovered.

2. The discovery method of Claim 1, further comprising sending from the source wireless device (WD-S) a device-to-device, D2D, connection request to a discovered wireless device to attempt establishing communication with the destination device.

3. The discovery method of claim 2, wherein the D2D connection request includes at least one of a source service set identifier, S-SSID, a global positioning system, GPS, position, a destination service set identifier, D-SSID, a path list of wireless devices in a path up to the discovered wireless device receiving the D2D connection request and an exclusion list that includes wireless devices that have been predetermined to be unable to reach the destination device and wireless devices for which reachability to the destination device has not been attempted.

4. The discovery method of claim 1, further comprising sending an E911 connection request from the source wireless device (WD-S) to a discovered wireless device for subsequent forwarding to an E911 service.

5. The discovery method of claim 4, wherein the E911 connection request includes at least one of a source service set identifier, S-SSID, a global positioning system, GPS, location, a source wireless device phone number, an exclusion list and a path list of wireless devices in path up to the intermediate wireless device (WD-X).

6. The discovery method of claim 1, further comprising, sending an E911 connection request via every wireless device in the path for subsequent forwarding to an E911 service by a wireless device in communication with the wireless base station, the E911 connection request triggering an indication that the wireless device in the path is relaying the E911 connection request.

7. The discovery method of claim 1, further comprising receiving at the source wireless device (WD-S) a connection success message from a discovered wireless device.

8. The discovery method of claim 1, wherein, when determining a path to the destination device is successful, sending a success message to every device in the path.

9. The discovery method of claim 1, wherein, when determining a path to the destination device is unsuccessful, sending a failure message to every discovered device.

10. A source wireless device (WD-S) configured to determine a communication path from the source wireless device (WD-S) to a destination device in a wireless communication network, the source wireless device (WD-S) comprising:
   processing circuitry including a memory and a processor:
   the memory configured to store a wireless base station connectivity status of each of a plurality of discovered wireless devices; and
   the processor configured to:
   discover wireless devices within communication range of the source wireless device (WD-S);
   determine, for each discovered wireless device, one of whether the discovered wireless device is the destination device and whether the discovered wireless device has wireless connectivity to a wireless base station;

include each discovered wireless device in a discovered wireless list; and prioritize the list of discovered wireless devices, wherein the prioritization of the list of discovered wireless devices is such that:

the destination device is accorded highest priority if the destination device is discovered;

discovered wireless devices having connectivity to a wireless base station are accorded a next highest priority in order of signal strength when at least one discovered wireless device has wireless connectivity to a wireless base station; and discovered wireless devices not having wireless connectivity to a base station are accorded a next highest priority in order of signal strength, when at least one discovered wireless device lacking connectivity to a wireless base station is discovered.

11. The source wireless device (WD-S) of claim 10, wherein the processor is further configured to send from the source wireless device (WD-S) a request to a discovered wireless device to attempt establishing communication with the destination device.

12. The source wireless device (WD-S) of claim 10, wherein the request includes at least one of a source service set identifier, S-SSID, a global positioning system, GPS, notification, a destination service set identifier, D-SSID, a path list of wireless devices in a path up to the included discovered wireless device and an exclusion list that includes wireless devices that have been predetermined to be unable to reach the destination device and wireless devices for which reachability to the destination device has not been attempted.

13. The source wireless device (WD-S) of claim 10, wherein the processor is further configured to send an E911 connection request from the source wireless device (WD-S) to a discovered wireless device for subsequent forwarding to an E911 service.

14. The source wireless device (WD-S) of claim 13, wherein the E911 connection request includes at least one of a source service set identifier, SSID, a global positioning system, GPS, notification, a source wireless device phone number, an exclusion list and a path list of wireless devices in path up to a relaying wireless device.

15. The source wireless device (WD-S) of claim 10, wherein the processor is further configured to send an E911 connection request via every wireless device in the path for subsequent forwarding to an E911 service by a wireless device in communication with the wireless base station, the E911 connection request triggering an indication that the wireless device in the path is relaying the E911 connection request.

16. The source wireless device (WD-S) of claim 10, wherein the processor is further configured to receive from the source wireless device (WD-S) a connection success message from the included discovered wireless device.

17. The source wireless device (WD-S) of claim 10, wherein, when determining a path to the destination device is successful, the processor is further configured to send a success message to every device in the path.

18. The source wireless device (WD-S) of claim 10, wherein, when determining a path to the destination device is unsuccessful, sending a failure message to every discovered device.

19. A source wireless device (WD-S) configured to determine a communication path from the source wireless device (WD-S) to a destination device in a wireless communication network, the source wireless device (WD-S) comprising:

a memory device configured to store a wireless base station connectivity status of each of a plurality of discovered wireless devices;

a discovery circuit configured to determine wireless devices within communication range of the source wireless device (WD-S); and a connectivity circuit configured to:

determine, for each discovered wireless device, one of whether the discovered wireless device is the destination device and whether the discovered wireless device has wireless connectivity to a wireless base station;

include each discovered wireless device in a discovered wireless list; and prioritize the list of discovered wireless devices, wherein the prioritization of the list of discovered wireless devices is such that:

the destination device is accorded highest priority if the destination device is discovered;

discovered wireless devices having connectivity to a wireless base station are accorded a next highest priority in order of signal strength when at least one discovered wireless device has wireless connectivity to a wireless base station; and discovered wireless devices not having wireless connectivity to a base station are accorded a next highest priority in order of signal strength, when at least one discovered wireless device lacking connectivity to a wireless base station is discovered.

* * * * *